US008966264B2

(12) United States Patent
Morioka (10) Patent No.: US 8,966,264 B2
(45) Date of Patent: Feb. 24, 2015

(54) SIGNATURE GENERATION APPARATUS, SIGNATURE METHOD, NON-TRANSITORY COMPUTER READABLE MEDIUM STORING SIGNATURE GENERATION PROGRAM

(75) Inventor: Sumio Morioka, Tokyo (JP)

(73) Assignee: NEC Corporation, Tokyo (JP)

( * ) Notice: Subject to any disclaimer, the term of this patent is extended or adjusted under 35 U.S.C. 154(b) by 1 day.

(21) Appl. No.: 13/700,202

(22) PCT Filed: Apr. 6, 2011

(86) PCT No.: PCT/JP2011/002051
§ 371 (c)(1),
(2), (4) Date: Nov. 27, 2012

(87) PCT Pub. No.: WO2011/148558
PCT Pub. Date: Dec. 1, 2011

(65) Prior Publication Data
US 2013/0073873 A1    Mar. 21, 2013

(30) Foreign Application Priority Data

May 28, 2010   (JP) .................................. 2010-122780

(51) Int. Cl.
*G06F 21/00*   (2013.01)
*H04L 9/32*    (2006.01)
*H04L 9/00*    (2006.01)

(52) U.S. Cl.
CPC .............. *H04L 9/3249* (2013.01); *H04L 9/003* (2013.01); *H04L 2209/08* (2013.01)
USPC .......................................... 713/170; 713/194

(58) Field of Classification Search
None
See application file for complete search history.

(56) References Cited

U.S. PATENT DOCUMENTS

| 7,774,617 | B2 * | 8/2010 | Dale et al. ..................... 713/189 |
| 8,199,910 | B2 * | 6/2012 | Morioka et al. ................ 380/28 |
| 2004/0030894 | A1 | 2/2004 | Labrou et al. | |
| 2006/0072743 | A1 * | 4/2006 | Naslund et al. ................ 380/28 |

(Continued)

FOREIGN PATENT DOCUMENTS

| JP | 2002-526797 | * | 8/2002 |
| JP | 2002-526840 | * | 8/2002 |

(Continued)

OTHER PUBLICATIONS

The international search report for PCT/JP2011/002051 mailed on May 10, 2011.
"ASIC implementation of a group signature algorithm using two-level behavioral synthesis", Sumio Morioka, Toshinori Araki, Toshiyuki Isshiki, Satoshi Obana, Kazue Sako, The Institute of Electronics, Information and Communication Engineers, VLSI Research Group, VLD 2009-128, pp. 175-180, 2010.

(Continued)

*Primary Examiner* — Gilberto Barron, Jr.
*Assistant Examiner* — Malcolm Cribbs
(74) *Attorney, Agent, or Firm* — Sughrue Mion, PLLC (57) ABSTRACT

A signature generation apparatus includes basic operation execution units each executing a basic operation included in a signature generation procedure; and a whole operation controller connected to the basic operation execution units to control operations in the basic operation execution units and monitor operation states of the basic operation execution units, in which when there is a basic operation execution unit among the basic operation execution units which is executing a secret operation which uses data to be concealed as an argument, the whole operation controller causes basic operation execution units other than the basic operation execution unit to simultaneously execute a random number operation which uses a random number originally used for signature generation as an argument.

13 Claims, 7 Drawing Sheets

(56) References Cited

U.S. PATENT DOCUMENTS

2008/0141340 A1    6/2008    Ohyama
2009/0296923 A1    12/2009    Morioka et al.
2010/0287384 A1    11/2010    Hubert

FOREIGN PATENT DOCUMENTS

| | | | |
|---|---|---|---|
| JP | 2002526797 A | | 8/2002 |
| JP | 2002526840 A | | 8/2002 |
| JP | 2003-337750 | * | 11/2003 |
| JP | 2003337750 A | | 11/2003 |
| JP | 2004-72777 | * | 3/2004 |
| JP | 2004072777 A | | 3/2004 |
| JP | 2004310752 A | | 11/2004 |
| JP | 2005-322018 | * | 11/2005 |
| JP | 2005322018 A | | 11/2005 |
| JP | 2006-54568 | * | 2/2006 |
| JP | 2006054568 A | | 2/2006 |
| JP | 2006243690 A | | 9/2006 |
| JP | 2007234001 A | | 9/2007 |
| JP | 2009500710 A | | 1/2009 |
| JP | 2010014912 A | | 1/2010 |

OTHER PUBLICATIONS

"Chosen-message SPA attacks against FPGA-based RSA hardware implementations," A. Miyamoto et al., FPL2008, pp. 35-40, 2008.

"Group signatures: Better efficiency and new theoretical aspects," J. Camenish and J. Groth,SCN2004, LNCS vol. 3352, pp. 120-133, 2004.

"Using Group Signature for Identity Management and its Implementation," T. Isshiki, K. Mori, K. Sako, I. Teranishi, and S. Yonezawa, DIM2006, 2006.

Sumio Morioka et al., "An ASIC implementation of a group signature algorithm using ESL design methodology", 2010 Nen Symposium on Cryptography and Information security Yokoshu CD-ROM, Jan. 19, 2010, 3C4-5.

Naofumi Homma, "Side Channel Attack on Cryptographic Modules and Its Security Evaluation", The IEICE Transactions on Fundamentals of Electronics, Communications and Computer Sciences (Japanese), Feb. 1, 2010, vol. J93-A, No. 2, pp. 42 to 51.

Mitsuari Hakuta, "Functions and Implementation of Cipher and Authentication Library", NTT R&D, vol. 48, No. 11, Nov. 10, 1999, vol. 48, No. 11, pp. 13 to 21.

* cited by examiner

SIGNATURE GENERATION APPARATUS, SIGNATURE METHOD, NON-TRANSITORY COMPUTER READABLE MEDIUM STORING SIGNATURE GENERATION PROGRAM

TECHNICAL FIELD

The present invention relates to a signature generation apparatus, a signature method, and a non-transitory computer readable medium storing a signature generation program that are suitable for achieving signature generation at high speed and with low power while maintaining a tolerance for side-channel attacks.

BACKGROUND ART

In recent years, a technique of group signature has been proposed in the fields of encryption and signature. The group signature technique is a technique for authenticating whether a signer belongs to a group which has a certain authorization. Which member in the group the signer is can be anonymized. This technique has an advantage that an authorized person can prevent a user from remaining anonymous if there is any problem, which makes it possible to prevent abuse of anonymity.

A group signature technique is disclosed, for example, in the following literatures (PTL 1, NPTL 1 to NPTL 4). NPTL 1 discloses a basic algorithm to generate and verify a group signature.

Further, NPTL 1 discloses a small-sized circuit that generates a group signature at high speed. A signature generation apparatus disclosed in NPTL 1 includes an elliptic curve operation circuit, an RSA operation circuit, and a hash operation circuit, and these circuits are connected by a low band bus. By appropriately adjusting the number of each operation circuit, it is possible to execute each operation of an elliptic curve operation, an RSA operation, and a hash operation in parallel and to increase the speed of signature generation without dramatically increasing the size of the circuits.

Incidentally, in the implementation of encryption, it is important to take measures against side-channel attacks which obtain secret information from the operation status of an apparatus which is performing encryption processing. The most typical method of the side-channel attacks that is known is to find out the value of a private key from waveforms of leakage electromagnetic waves or power consumption waveforms of a circuit.

Various methods have been known as the side-channel attacks. Regarding public key encryption such as RSA encryption and elliptic encryption, a method called a timing attack which uses the fact that the operation time changes according to the value of each bit of the key, and a method called SPA (Simple Power Analysis) that uses the fact that the magnitude of power consumption changes according to the value of each bit of the key are popular and the most dangerous.

Well-known countermeasures against the timing attack or the SPA include a method of adding and executing a pseudo operation to prevent the operation time or power consumption from being varied depending on the values of the key, and a method of adding a circuit for operation using a random value to achieve parallel operations. As long as a public key encryption circuit is used, the principle of the countermeasures that are used is substantially the same both in RSA encryption and in elliptic encryption.

For example, NPTL 2 and PTL 2 to PTL 4 disclose countermeasure techniques against side-channel attacks. NPTL 2 discloses a method of side-channel attacks against an RSA encryption circuit, and measures to take against the attack. PTL 2 discloses a countermeasure technique against side-channel attacks for a scalar operation on an elliptic curve (paragraphs 0022-0027, 0139-0145).

PTL 3 discloses performing a simultaneous operation of an inverse transform operation, to execute a routine to prevent side-channel attacks (paragraphs 0010-0012, 0035-0041). PTL 3 takes measures using an inverse transform operation (complementary operation), and uses a random value for disturbance of an operation time length. PTL 4 discloses masking an intermediate variable value with a random value as a countermeasure technique against side-channel attacks.

CITATION LIST

Patent Literature

PTL 1: Japanese Unexamined Patent Application Publication No. 2010-014912
PTL 2: Japanese Unexamined Patent Application Publication No. 2006-243690
PTL 3: Japanese Unexamined Patent Application Publication No. 2007-234001
PTL 4: Published Japanese Translation of PCT International Publication for Patent Application, No. 2009-500710

Non Patent Literature

NPTL 1: Sumio Morioka, Toshinori Araki, Toshiyuki Isshiki, Satoshi Obana, Kazue Sako, "ASIC implementation of a group signature algorithm using two-level behavioral synthesis", The Institute of Electronics, Information and Communication Engineers, VLSI Research Group, VLD 2009-128, pp. 175-180, 2010
NPTL 2: A. Miyamoto et al., "Chosen-message SPA attacks against FPGA-based RSA hardware implementations," FPL2008, pp. 35-40, 2008.
NPTL 3: J. Camenish and J. Groth, "Group signatures: Better efficiency and new theoretical aspects," SCN2004, LNCS Vol. 3352, pp. 120-133, 2004.
NPTL 4: T. Isshiki, K. Mori, K. Sako, I. Teranishi, and S. Yonezawa, "Using Group Signature for Identity Management and its Implementation," DIM2006, 2006.

SUMMARY OF INVENTION

Technical Problem

However, all the countermeasure techniques disclosed in NPTL 2 and the like are the technique for individual encryption operations such as the elliptic curve operation and the RSA operation, although they have the same purpose of taking measures against side-channel attacks. Accordingly, if such a countermeasure technique for individual operations is directly applied to all the operations included in the signature generation algorithm, it leads to a decrease in signature generation speed, an increase in power consumption, and an increase in circuit size although it is possible to give a high tolerance for side-channel attacks.

For example, when a pseudo operation is simply added to all the operations as a measure against side-channel attacks, the operation time is doubled at worst (1.5 times in average). Further, the power consumption amount increases as well by adding the pseudo operation. The reason for this is as follows. In the public key encryption circuit, multiplication or modular multiplication on a finite field are repeated for a plurality of times, and multipliers that consume electric power the most have substantially the same circuit configuration. Thus, the power consumption amount in the public key encryption circuit is substantially the same both in the RSA encryption and the elliptic encryption. Further, when a random operation circuit is added, for example, the size of the circuit is almost doubled.

Accordingly, a technique for achieving signature generation by a small-sized circuit at high speed and with low power while having a tolerance for side-channel attacks has been strongly demanded.

In particular, as is different from the normal digital signature, in the group signature, the RSA encryption operation, the elliptic encryption operation and the like are executed while being combined in a complex manner. When a conventional countermeasure technique against side-channel attacks is uniformly applied to all the operations included in the group signature generation algorithm, the operation time required to generate the group signature is doubled at worst (1.5 times in average), or the size of the circuit is almost doubled. Further, power consumption increases in the similar way. Further, the group signature has the characteristics that the amount of operations and the amount of circuits are larger than those in the normal digital signature. Thus, the decrease in the speed of such operation processing, high power consumption, the increase in the size of the circuit and the like are not desirable.

The present invention solves the aforementioned problems, and aims to provide a signature generation apparatus, a signature method, and a non-transitory computer readable medium storing a signature generation program having a high tolerance for side-channel attacks such as timing attack or SPA without causing a decrease in signature generation speed, an increase in power consumption, an increase in circuit size and the like.

Solution to Problem

A signature generation apparatus according to a first exemplary aspect of the present invention includes: a plurality of basic operation execution units each executing a basic operation included in a signature generation procedure; and a whole operation controller connected to the plurality of basic operation execution units to control operations in the basic operation execution units and monitor operation states of the basic operation execution units, in which when there is a basic operation execution unit among the plurality of basic operation execution units which is executing a secret operation which uses data to be concealed as an argument, the whole operation controller causes other basic operation execution units than the basic operation execution unit to simultaneously execute a random number operation which uses a random number as an argument.

A signature generation method according to a second exemplary aspect of the present invention is a signature generation method in which: a signature generation apparatus executes basic operations included in a signature generation procedure in parallel, and when a secret operation which uses data to be concealed as an argument is executed while the basic operations are executed in parallel, the signature generation apparatus simultaneously executes a random number operation which uses a random number as an argument.

A non-transitory computer readable medium according to a third exemplary aspect of the present invention stores a signature generation program for causing a computer to execute the following processing of: executing basic operations included in a signature generation procedure in parallel; and simultaneously executing a random number operation which uses a random number as an argument while executing a secret operation which uses data to be concealed as an argument in the processing of executing the basic operations in parallel.

Advantageous Effects of Invention

According to the present invention, it is possible to provide a signature generation apparatus, a signature generation method, and a non-transitory computer readable medium storing a signature generation program that are suitable for achieving signature generation at high speed and with low power while maintaining a tolerance for side-channel attacks without causing a decrease in signature generation speed, an increase in power consumption, and an increase in circuit size.

DESCRIPTION OF EMBODIMENTS

First, prior to the description of each exemplary embodiment, the principle of the present invention will be described with reference to FIG. 1.

Figure 1:
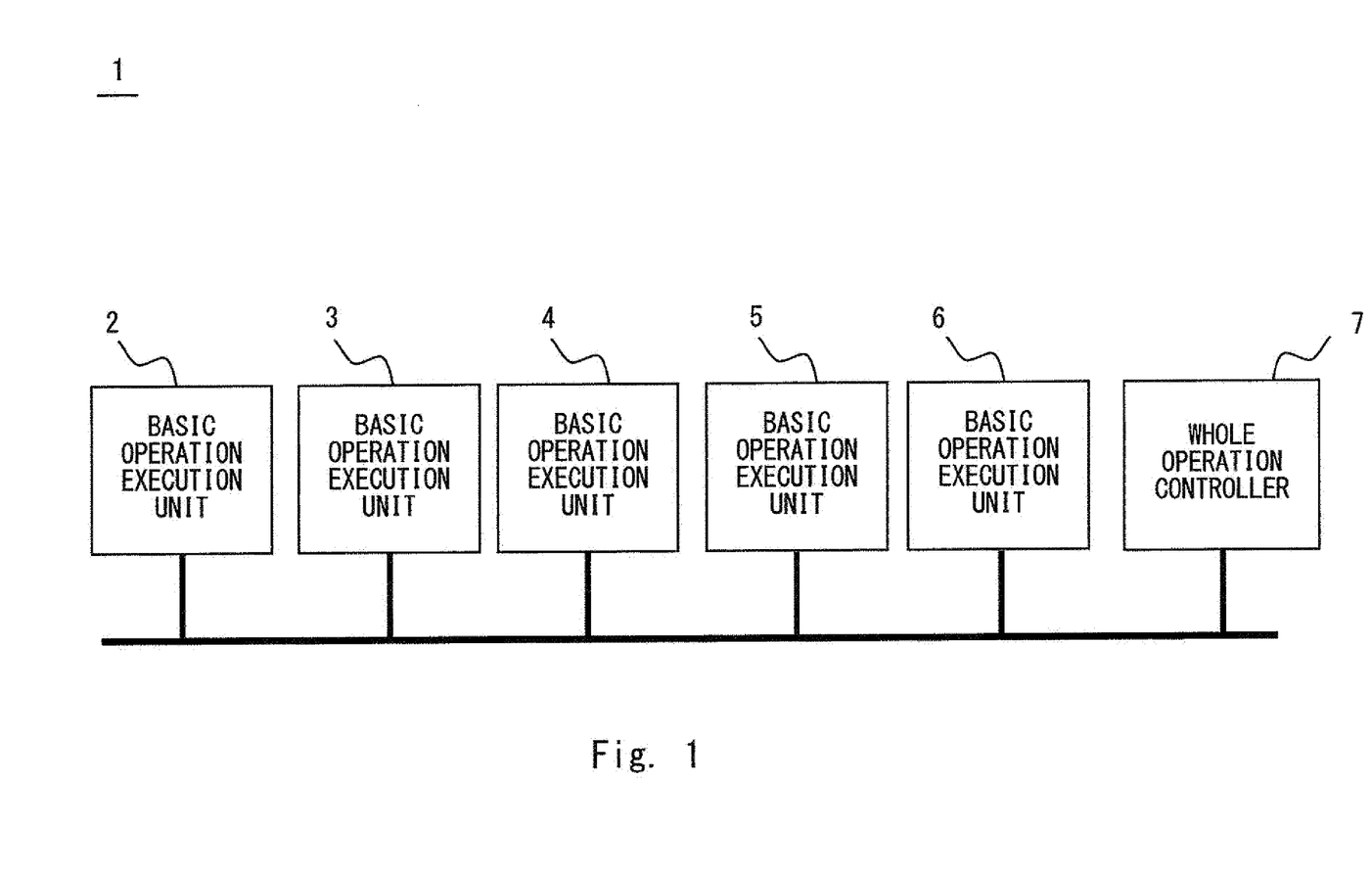
FIG. 1 is a diagram for describing the principle of the present invention.

As shown in FIG. 1, a signature generation apparatus 1 according to the present invention includes a plurality of basic operation execution units (basic operation execution units 2-6) and a whole operation controller 7. The basic operation execution units 2-6 and the whole operation controller 7 are connected each other.

The basic operation execution units 2-6 each execute any of basic operations included in a signature generation procedure. The basic operation execution units 2-6 each execute the basic operation, so that the signature generation apparatus 1 executes a complex operation of the basic operations as a whole. The signature generation procedure includes, for example, an RSA operation, an elliptic curve operation, an integer operation, and the like.

The whole operation controller 7 controls operations in the basic operation execution units 2-6, and monitors the operation states of the basic operation execution units 2-6.

When there is a basic operation execution unit among the basic operation execution units 2-6 which is executing a secret operation which uses data to be concealed as an argument, the whole operation controller 7 causes other basic operation execution units than the corresponding basic operation execution unit to concurrently execute a random number operation which uses a random number as an argument. Here, the data to be concealed means data which should be concealed from side-channel attacks, and includes, for example, a value of a private key that is used when a signature is generated.

Figure 2:
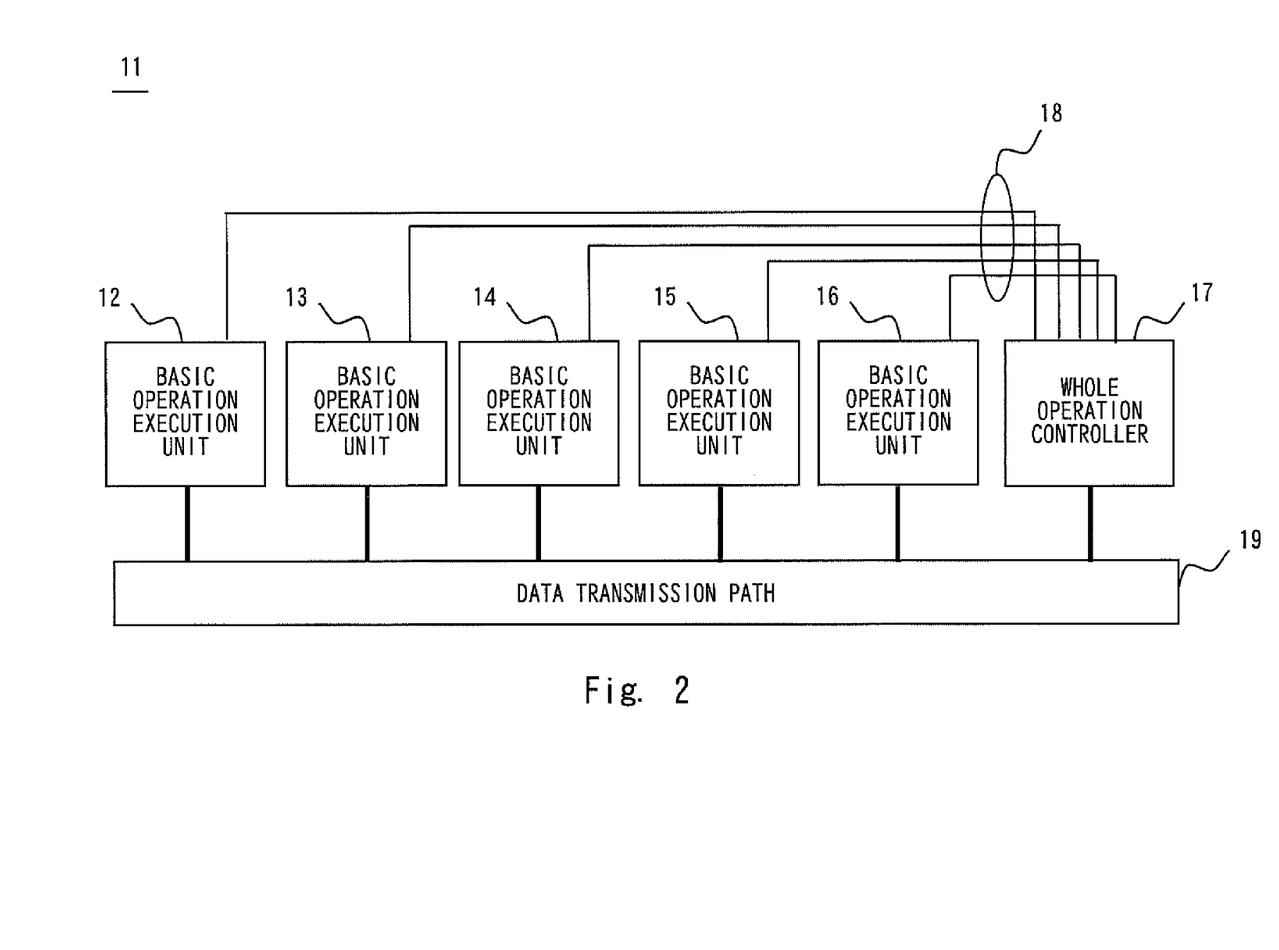
FIG. 2 is a schematic configuration diagram of a signature generation apparatus according to the present invention.
Figure 3:
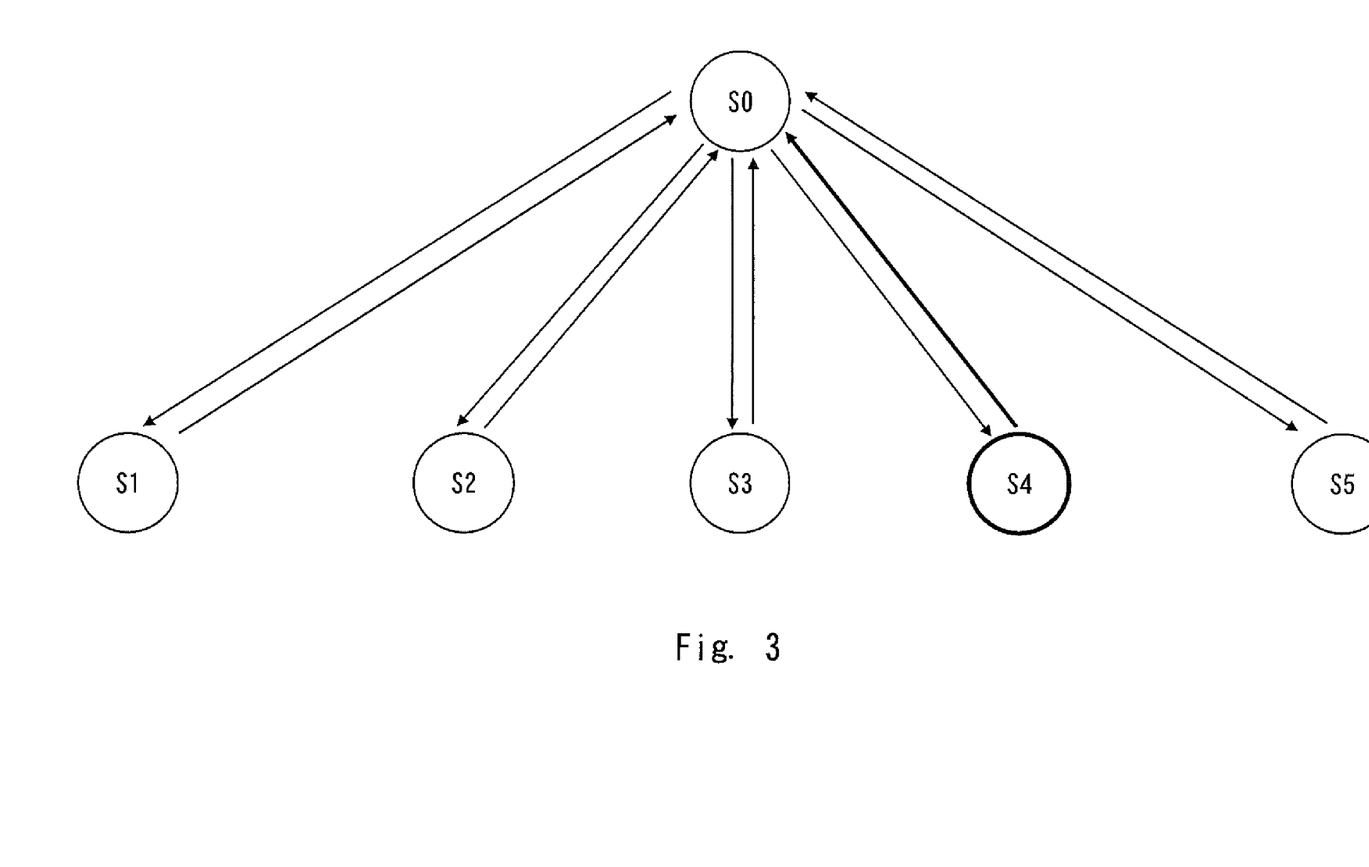
FIG. 3 is a state transition diagram of a basic operation execution unit of the signature generation apparatus according to the present invention.

Next, with reference to FIGS. 2 and 3, the outline of a signature generation apparatus according to the present invention will be described. FIG. 2 is a schematic configuration diagram of the signature generation apparatus according to the present invention. FIG. 3 is a state transition diagram of each of the basic operation execution units.

As shown in FIG. 2, a signature generation apparatus 11 includes a plurality of basic operation execution units (basic operation execution units 12-16), a whole operation controller 17, a communication path 18, and a data transfer path 19. Each of the basic operation execution units 12-16 and the whole operation controller 17 are connected each other via the communication path 18. Further, the basic operation execution units 12-16 and the whole operation controller 17 are connected each other via the data transfer path 19.

The basic operation execution units 12-16 each execute one of the basic operations stated above. Further, the basic operation execution units 12-16 each have an operation state according to the operation content. The basic operation execution units 12-16 each transmit an operation state transmission signal indicating the operation state of itself to the whole operation controller 17 via the communication path 18.

The whole operation controller 17 controls, via the data transfer path 19, the type of the operation executed by each of the basic operation execution units 12-16, the order of the execution of the operations, input/output of the operation data, and the like. Further, the whole operation controller 17 monitors the operation state of each of the basic operation execution units 12-16 from the operation state transmission signals, and transmits a random number operation instruction signal which instructs start of execution of a forced random number operation, and random number data which is an argument of the random number operation to the basic operation execution units 12-16 via the communication path 18.

When there is a basic operation execution unit among the basic operation execution units 12-16 which is executing the secret operation, the whole operation controller 17 causes other basic operation execution units than the corresponding basic operation execution unit to execute the random number operation which uses a random number as an argument. Here, the random number operation may be a random number operation included in a signature operation, or may be a forced random number operation using random number data which is newly generated.

Further, when the total number of the basic operation execution units that are executing the random number operation and the basic operation execution units that are executing the forced random number operation is smaller than the number of basic operation execution units that are executing the secret operation, the whole operation controller 17 executes the forced random number operation using the basic operation execution units that are executing no operation, to perform a control so that the total number of the basic operation execution units that are executing the random number operation and the basic operation execution units that are executing the forced random number operation becomes equal to or larger than the number of basic operation execution units that are executing the secret operation.

The communication path 18 transmits signals between the whole operation controller 17 and each of the basic operation execution units 12-16. The communication path 18 includes a plurality of signal lines provided for the respective basic operation execution units 12-16. The communication path 18 is a bidirectional path of a width of one bit to several bits. By providing the dedicated communication path 18 which is different from the data transfer path 19 between the basic operation execution units 12-16 and the whole operation controller 17, the whole operation controller 17 is able to send a response to the basic operation execution units 12-16 at higher speed compared to the case in which the data transfer path 19 is used.

The data transfer path 19 is a path to perform data transfer among the basic operation execution units 12-16 and data transfer between the whole operation controller 17 and the basic operation execution units 12-16. Input/output data used for the basic operations, a processing start instruction or the like are transferred bi-directionally via the data transfer path 19. The configuration of the data transfer path 19 is not specifically limited. For example, the data transfer path 19 may be formed using one bus, or may be formed using a plurality of buses. Further, the data transfer path 19 may be formed using a crossbar switch or the like. In the signature generation apparatus for the group signature, the data transfer path 19 is preferably formed using one bus. This is because, since a public key encryption operation is mainly performed, the operation time inside each of the basic operation execution units 12-16 is overwhelmingly larger than the data transfer time among the basic operation execution units 12-16.

As shown in FIG. 3, the basic operation execution units each include six operation states (S0-S5) defined as follows. While six operation states are exemplified here, described in the first exemplary embodiment stated below as an example is a case in which at least five operation states (S0-S4) are sufficient, and described in the second exemplary embodiment stated below as an example is a case in which six operation states (S0-S5) are included.

S0: stop
  the state in which no operation is executed by the basic operation execution unit;
S1: secret operation is being executed
  the state in which an operation which requires hiding of power waveforms is being executed, and an operation using data to be concealed as an argument is being executed;
S2: normal operation is being executed
  the state in which an operation which does not require hiding of power waveforms is being executed;
S3: random number operation is being executed
  the state in which an operation which achieves random power waveforms is being executed, and an operation which uses a random number originally used for signature generation as an argument is being executed;
S4: forced random number operation is being executed
  the state in which a forced random number operation is being executed which uses random number data to be newly generated as an argument to disturb power waveforms, and an operation which is not required for the signature generation processing itself is being executed; and
S5: another processing is being executed
  the state in which, when the basic operation execution unit is formed using multi-core, for example, the basic operation execution unit is being used for processing completely different from the signature generation processing.

The whole operation controller 17 controls transitions from state S0 to state S1, from state S0 to state S2, from state S0 to state S3, and from state S0 to state S5 as shown in FIG. 3. For example, the transition from state S0 to state S1 is performed according to an instruction from the whole operation controller 17 performed via the data transfer path 19. Further, the transition from state S1 to state S0 is performed according to completion of the operation in each of the basic operation execution units. However, transitions regarding the forced random number operation (transitions from state S0 to state S4, from state S4 to state S0) are performed according to a random number operation instruction signal transmitted via the communication path 18. Further, the transition from state S4 to state S0 is performed according to the random number operation instruction signal instead of being performed according to completion of the operation.

Note that the basic operation execution units 12-16 and the whole operation controller 17 shown in FIG. 2 may be formed using a circuit that is designed exclusively (hardware accelerator), or may be formed using one or a plurality of CPUs (Central Processing Units) for executing software. Further, the basic operation execution units 12-16 may be formed using a dedicated circuit or a CPU, or the mixture thereof. Further, when they are formed of a multiple core using a plurality of CPUs, in the signature generation processing, not all the basic operation execution units may be formed of CPUs, but only a part of the basic operation execution units may be formed of CPUs.

Further, the signature generation apparatus stated above is not limited to the signature generation apparatus to generate the group signature, but may be applied to other apparatuses that execute security-related complex operations.

Next, the group signature related to the present invention will be described in brief. As described above, NPTL 1 discloses a basic algorithm for performing generation and verification of group signature. Accordingly, in the following description, the group signature disclosed in NPTL 1 will be described in brief as one example of the group signature system.

Four entities of an issuer, an opener, a user-revocation manager, and a user participate in the scheme of the group signature. The user performs signature generation and verification, and is a member of the group. The issuer has the authority to add the user to the group, the opener has the authority to identify the signer, and the user-revocation manager has the authority to remove the user from the group. In this description, only signature generation used by the user will be described among procedures included in the group signature scheme.

Hereinafter, the security parameters $K=(K[n], K[1], K[e], K[e'], K[q], K[c], K[S])$ are introduced. The symbols $K[n]$, $K[1]$, $K[e]$, and $K[e']$ denote bit numbers for parameters n, 1, e, and e', respectively, and have predetermined bit lengths $K[n]$, $K[1]$, $K[e]$, and $K[e']$, respectively. The symbol $K[q]$ denotes a bit length of a prime number q denoting the order of a finite group GG defined by an elliptic curve. The symbol $K[c]$ denotes a bit length of the value c returned by a hash function Hash applied to a bit sequence of arbitrary length. The symbol $K[S]$ denotes a bit length such that when a random number r of bit length $|a|+K[S]$ for any integer a is selected, then a+r and a are statistically indistinguishable.

The group signature is a group signature for such a security parameter K, an integer $\lambda=K[n]+K[q]+K[S]$, a set of integer values $\Lambda$ in a range from 0 (inclusive) to $2^\lambda$ (exclusive), scalar multiplication on the elliptic curve, point addition on the elliptic curve, and point subtraction on the elliptic curve. In the following description, "$x_s$" denotes scalar multiplication for a point on the elliptic curve, "$+_e$" denotes point addition on the elliptic curve, and "$-_e$" denotes point subtraction on the elliptic curve.

The key pair (public key and private key) held by each of the issuer, the opener, the user-revocation manager, and the user of the group signature stated above will be described below.

The Issuer's key pair (ipk, isk) for the group signature is defined, as shown in the following formulae, based on cryptographic theoretical safe prime numbers $p[1]$ and $p[2]$ of bit length $K[n]/2$, $n=p[1]p[2]$, and elements $a[0]$, $a[1]$, and $a[2]$ of the cyclic subgroup QR (n) with respect to n. Here, ipk denotes a public key of the issuer, and isk denotes a private key of the issuer.

$ipk=(n,a[0],a[1],a[2])$;
$isk=(p[1],p[2])$

The Opener's key pair (opk, osk) for the group signature is defined, as shown in the following formulae, based on the elements $y[1]$ and $y[2]$ of the prime number q-modulo finite field Zq, an element G of the above finite group GG, $H[1]=y[1]x_sG$, and $H[2]=y[2]x_sG$. Here, opk denotes a public key of the opener, and osk denotes a private key of the opener.

$opk=(q,G,H[1],H[2])$;
$osk=(y[1],y[2])$

The User-Revocation manager's key pair (rpk, rsk) for the group signature is defined, as shown in the following formulae, based on safe prime numbers $1[1]$ and $1[2]$ of bit length $K[1]/2$, $1=1[1]1[2]$, and elements b and w of the cyclic subgroup QR (1) with respect to 1. Here, rpk denotes a public key of the user-revocation manager, and rsk denotes a private key of the user-revocation manager.

$rpk=(1,b,w)$;
$rsk=(1[1],1[2])$

The user's key pair (mpk, msk) for the i-th user for the group signature is defined, as shown in the formulae below, based on an element $x[i]$ of the above set $\Lambda$, $h[i]=x[i]x_sG$, and $A[i],B[i],e[i],e'[i]$ that satisfy $B[i]=b^{1/e'[i]} \pmod 1$, $e[i]=2^{K[e]}+e'[i]$, and $a[0]a[1]^{x[i]} \equiv A[i]^{e[1]} \pmod n$. Here, mpk[i] denotes a public key of the i-th user, and msk[i] denotes a private key of the i-th user.

$msk[i]=x[i]$;
$mpk[i]=(h[i],A[i],e'[i],B[i])$

Then, in the signature generation algorithm, when the i-th user generates a signature for a message m, the public key ipk of the issuer, the public key rpk of the user-revocation manager, the public key opk of the opener, the private key msk[i] of the user, and the message m are input to generate the signature as follows.

(1) The symbols $\rho[E]$, $\rho[m]$, $\rho[r]$, $\mu[x]$, $\mu[s]$, $\mu[e']$, $\mu[t]$, and $\mu[E]$ are randomly selected as follows.

$\rho[E]$: an element of the above finite field Zq
$\rho[m]$: a bit sequence of bit length $K[n]/2$
$\rho[r]$: a bit sequence of bit length $K[1]/2$
$\mu[x]$: a bit sequence of bit length $\lambda+K[c]+K[S]$
$\mu[s]$: a bit sequence of bit length $K[e]+K[n]/2+K[c]+K[S]$
$\mu[e']$: a bit sequence of bit length $K[e']+K[c]+K[S]$
$\mu[t]$: a bit sequence of bit length $K[e']+K[1]/2+K[c]+K[S]$
$\mu[E]$: an element of the above finite field Zq (2) The symbols E[0], E[1], E[2], E, and V[ComCipher] are obtained by the following operation. Note that the operation "Z=(W, X, Y)" indicates that the operation W, the operation X, and the operation Y are combined after being separately executed (tuple calculation).

$$E[0]=\rho[E]x_sG$$

$$E[1]=h[i]+_e\rho[E]x_sH[1]$$

$$E[2]=h[i]+_e\rho[E]x_sH[2]$$

$$E=(E[0],E[1],E[2])$$

$$V[\text{ComCipher}]=(\mu[E]x_sG,\mu[x]x_sG+_d\mu[E]x_sH[1],$$
$$\mu[x]x_sG+_d\mu[E]x_sH[2])$$

(3) The symbols A[COM], B[COM], V[ComMPK], and V[ComREV] are obtained by the following operation.

$$A[\text{COM}]=A[i]a[2]^{\rho[m]}(\text{mod } n)$$

$$B[\text{COM}]=B[i]w^{\rho[r]}(\text{mod } 1)$$

$$V[\text{ComMPK}]=a[1]^{\mu[x]}a[2]^{\mu[s]}A[\text{COM}]^{-\mu[e']}(\text{mod } n)$$

$$V[\text{ComREV}]=w^{\mu[r]}B[\text{COM}]^{\mu[e']}(\text{mod } 1)$$

(4) The symbol c is obtained by the following operation.

$$c=\text{Hash}$$

$$(K,ipk,opk,rpk,E,A[\text{COM}],B[\text{COM}],V[\text{ComCipher}],$$
$$V[\text{ComMPK}],V[\text{ComRev}],m)$$

(5) The symbols $\tau[x]$, $\tau[s]$, $\tau[t]$, $\tau[e']$, and $\tau[E]$ are obtained by the following operation.

$$\tau[x]=cx[i]+\mu[x](\text{mod } q)$$

$$\tau[s]=ce[i]\rho[m]+\mu[s](\text{mod } q)$$

$$\tau[t]=ce'[i]\rho[r]+\mu[t](\text{mod } q)$$

$$\tau[e']=ce'[i]\mu[e'](\text{mod } q)$$

$$\tau[E]=c\rho[E]+[E](\text{mod } q)$$

(6) The signature (E,A[COM],B[COM],c,$\tau[x]$,$\tau[s]$,$\tau[t]$,$\tau[e']$,$\tau[E]$) is output.

Figure 4:
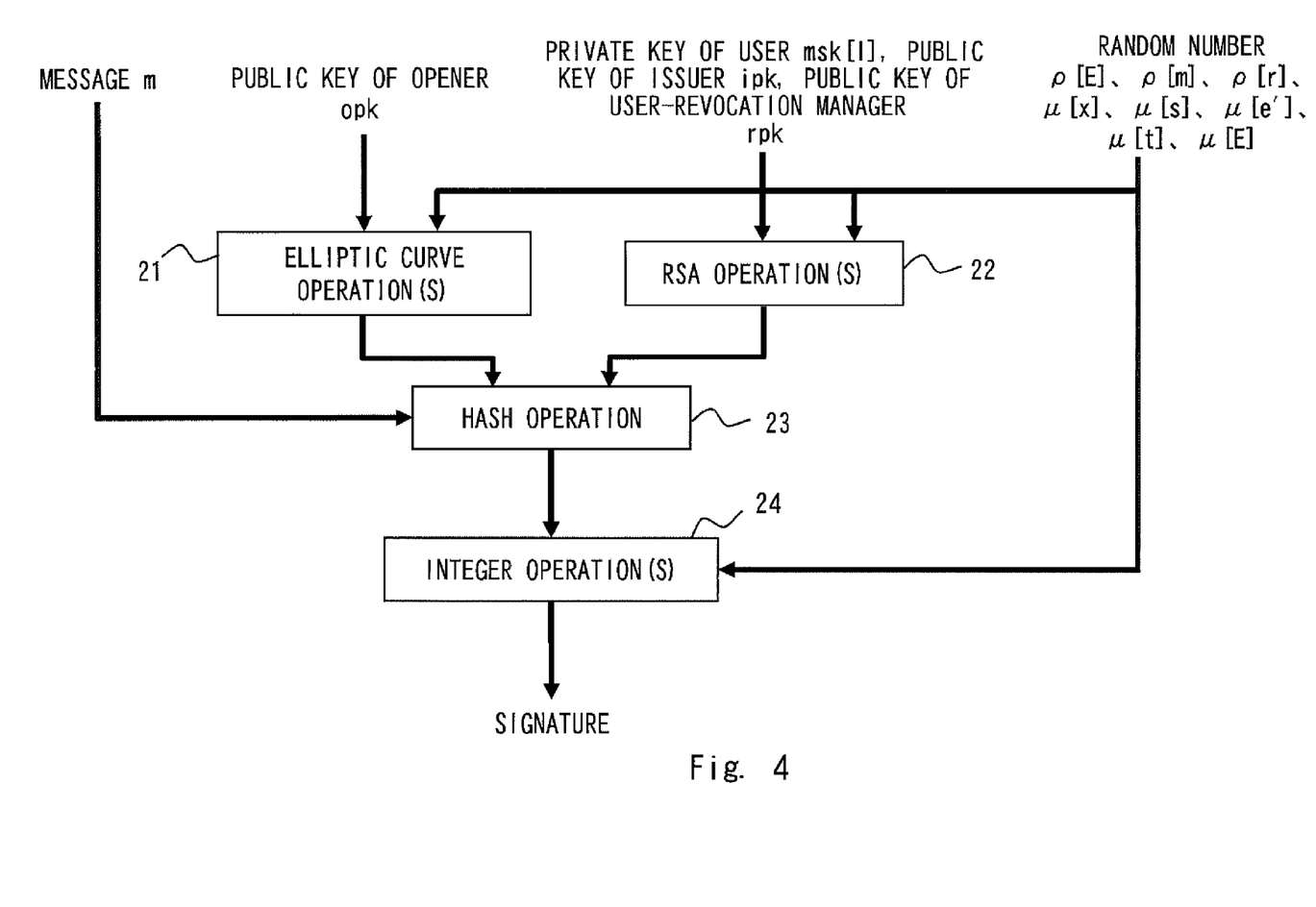
FIG. 4 is a schematic flow diagram of the signature generation processing according to the present invention.

FIG. 4 is a diagram showing a data flow in the group signature generation processing. The random number shown in FIG. 4 is a random value selected in the above "(1)".

In the elliptic curve operation 21, a plurality of elliptic curve operations are performed using the public key of the opener and the random number. In the elliptic curve operation 21, each operation of the above "(2)" is mainly performed.

In the RSA operation 22, a plurality of RSA operations are executed using the private key of the user, the public key of the issuer, the public key of the user-revocation manager, and the random number. In the RSA operation 22, each operation of the above "(3)" is mainly executed.

In the hash operation 23, a hash operation is performed using the operation result in the elliptic curve operation 21, the operation result in the RSA operation 22, and the message m. In the hash operation 23, the operation of the above "(4)" is mainly performed.

In the integer operation 24, a plurality of integer operations are performed using the operation result in the hash operation 23, and the random number. In the integer operation 24, each operation of the above "(5)" is mainly performed. The signature is output as the result of the integer operation 24.

First Exemplary Embodiment

Hereinafter, an exemplary embodiment of the present invention will be described with reference to the drawings. A signature generation apparatus according to this exemplary embodiment shows an example in which the configuration and the function for the group signature generation described above are implemented as hardware.

Figure 5:
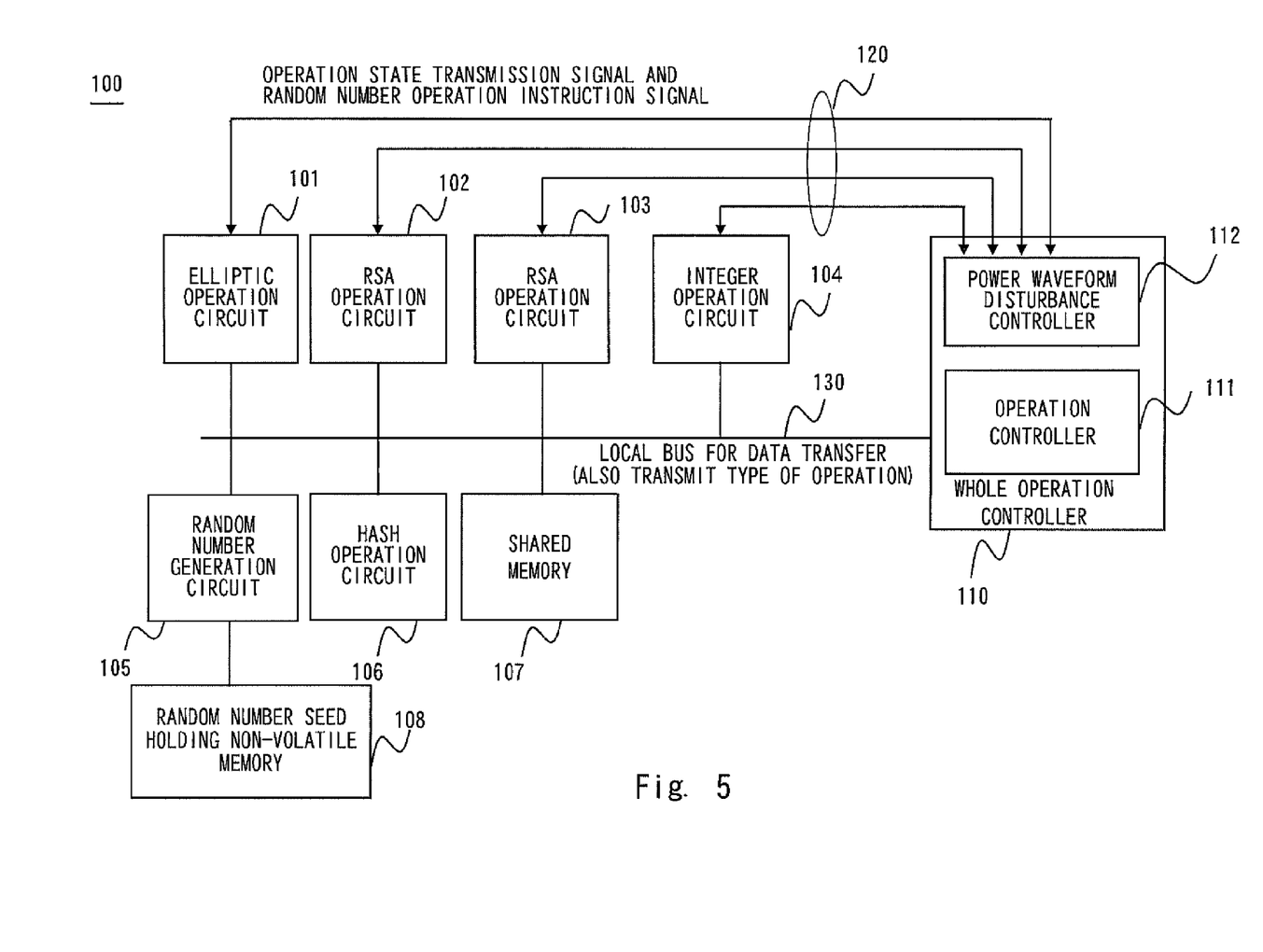
FIG. 5 is a configuration diagram of a signature generation apparatus according to a first exemplary embodiment.

FIG. 5 is a configuration diagram of the signature generation apparatus according to the first exemplary embodiment. A signature generation apparatus 100 includes an elliptic operation circuit 101, RSA operation circuits 102 and 103, an integer operation circuit 104, a random number generation circuit 105, a hash operation circuit 106, a shared memory 107, a random number seed holding non-volatile memory 108, a whole operation controller 110, a plurality of signal lines 120, and a local bus for data transfer 130. While one elliptic operation circuit 101, two RSA operation circuits 102 and 103, one integer operation circuit 104, and one random number generation circuit 105 are exemplified in FIG. 5, the number of each circuit is not limited to this but may be defined according to the trade-off between the operation circuit speed and the size.

In the signature generation apparatus 100 according to this exemplary embodiment, no individual measure against side-channel attacks is taken in each operation circuit (the elliptic operation circuit 101, the RSA operation circuits 102 and 103, the integer operation circuit 104, the random number generation circuit 105, and the hash operation circuit 106). Therefore, the operation time does not increase compared to the case in which no measures are taken. While the operation time required to perform the whole group signature generation varies depending on the values of the key, the operation time varies while keeping the fastest speed. Further, while power consumption also varies depending on the values of the key, it varies while keeping the lowest amount.

Further, when generating the group signature as stated above, the signature generation apparatus 100 receives the public key of the issuer, the public key of the user-revocation manager, the public key of the opener, the private key of the user, the message and the like, to execute the elliptic curve operation, the RSA operation and the like about 70 times while combining them. When generating the group signature, the signature generation apparatus 100 masks the key using the random number to be generated. Since there is no need to conceal the public key or the private key that has already been masked, no measures need to be taken against side-channel attacks. Thus, it is sufficient to hide at least the private key and the random number to mask the private key against side-channel attacks. Accordingly, in this exemplary embodiment, the private key and the random number to mask the private key are treated as data to be concealed, and measures against side-channel attacks are taken for only the operation which uses the data to be concealed as a direct argument.

The elliptic operation circuit 101 executes elliptic curve operations such as scalar multiplication on the elliptic curve, point addition and point subtraction on the elliptic curve, and the like. When generating the group signature described above, the elliptic operation circuit 101 mainly executes each operation included in the above "(2)".

The RSA operation circuits 102 and 103 execute RSA operations such as modular exponentiation, modular multiplication and the like. When generating the group signature described above, the RSA operation circuits 102 and 103 mainly execute each operation included in the above "(3)".

The integer operation circuit 104 executes integer operations such as integer multiplication, integer addition and the like. When generating the group signature described above, the integer operation circuit 104 mainly executes each operation included in the above "(5)".

Each operation circuit (the elliptic operation circuit 101, the RSA operation circuits 102 and 103, and the integer operation circuit 104) has five states stated above (the stopped state S0, the secret operation state S1, the normal operation state S2, the random number operation state S3, and the forced random number operation state S4).

In the stopped state S0, each operation circuit executes no meaningful operation. This is a state in which a new operation can be started at any time.

The secret operation state S1 is a state of executing an operation which uses data to be concealed (the private key or the random number to mask the private key) as a direct argument, which is a state of executing an operation that should be protected against side-channel attacks. When the group signature described above is generated, the operation circuit is in the secret operation state S1 when it executes an operation which uses the private key x[i] of the signer (i-th user) as a direct argument and an operation which uses the random mask μ[x] of the private key x[i] as a direct argument. More specifically, the operation circuit is in the secret operation state S1 when it executes scalar multiplication μ[x]x$_s$G on the elliptic curve, modular exponentiation a[1]$^{μ[x]}$ (mod n), and integer multiplication cx[i]+μ[x] (mod q).

The normal operation state S2 is a state in which the normal operation is executed which uses data except the random number (the public key and the like) as an argument, the data not being required to be concealed. In the normal operation state S2, an operation that is not required to be protected against side-channel attacks is executed. In the normal operation state S2, waveforms of power consumed in the operation circuit are not random.

The random number operation state S3 is a state in which two types of random number operations are executed: one is a random number operation which uses a random number used to mask data other than the secret key as an argument, and the other one is a random number operation which uses data that has already been masked as an argument. In the random number operation state S3, the operation which is not required to be protected against side-channel channel attacks is executed. In the random number operation state S3, waveforms of power consumed in the operation circuit become random. When the group signature described above is generated, the operation circuit is in the random number operation state S3 when the operation circuit executes an operation which uses a randomly-selected value (ρ[E], ρ[m], ρ[r], μ[s], μ[C], μ[t], μ[E] (random numbers except μ[x])) as an argument, and an operation which uses a result of the mask operation using the random numbers as an argument.

The forced random number operation state S4 is a state in which the random number operation to disturb the power waveforms is forcibly executed to protect the operation against side-channel attacks. In the forced random number operation state S4, a forced random number operation is executed which uses a random number value that is newly generated as an argument. The operation executed in the forced random number operation state S4 is an operation which is not originally required as the signature generation processing. In the forced random number operation state S4, waveforms of power consumed in the operation circuit become random.

Each of the operation circuits transmits the operation state transmission signal indicating the state of itself to the whole operation controller 110 via the signal line 120. Specifically, each of the operation circuits transmits an output signal (operation state transmission signal) of two bits or more indicating in which state of the five states (S0-S4) it is via the signal line 120.

The signal line 120 includes one or more signal lines independent from one another. The signal line 120 includes a signal line to transmit the operation state transmission signal, and a signal line to transmit the random number operation instruction signal which will be described later and random number data which is an argument of the random number operation. Note that signals transmitted via the signal line 120 are different from a typical interrupt signal (1-bit).

The random number generation circuit 105 generates random numbers used by the signature generation apparatus 100 (a true random number, a physical random number, a high-quality pseudo random number, and the like). When the group signature described above is generated, the random number generation circuit 105 mainly performs each operation included in the above "(1)". Note that a plurality of random number generation circuits may be provided.

The hash operation circuit 106 performs a hash operation using a hash function such as SHA1-1 or SHA-2, for example. When the group signature described above is generated, the hash operation circuit 106 mainly performs each operation included in the above "(5)".

The shared memory 107 is a memory such as an SRAM (Static Random Access Memory), for example. The operation result in each circuit connected to the local bus for data transfer 130 is temporarily stored in the shared memory 107.

The random number seed holding non-volatile memory 108 is a non-volatile semiconductor memory such as an EEPROM (Electrically Erasable and Programmable Read Only Memory) or a flash memory, for example. The random number seed holding non-volatile memory 108 stores an initial value (initial seed) when the random number generation processing is executed.

The whole operation controller 110 starts each of the operation circuits, the random number generation circuit 105 and the like stated above in a predetermined procedure, to control the operation of the whole signature generation apparatus 100. When the group signature described above is generated, the whole operation controller 110 notifies each circuit of the type of the operation to be executed or instructs each circuit to start the execution of the operation via the local bus for data transfer 130, to control input/output of the operation data between circuits via the data transfer path 19 or storage of the operation data to the shared memory 107.

It may be determined in which order and which state each of the operation circuits should be entered in advance prior to the group signature generation (for example, it may be set according to the determination by a designer in advance at the time of circuit design).

However, when the start of the operation is instructed to an operation circuit, the end of this operation cannot be known in advance since it depends on the values of the data to be operated. Thus, the whole operation controller 110 instructs each operation circuit to start the operation, and monitors the operation state of each operation circuit from the operation state transmission signal transmitted via the signal line 120, to determine the end of the operation in each operation circuit. Accordingly, the whole operation controller 110 is able to dramatically determine the operation state in each operation circuit and the start and the end of the operation.

Further, the whole operation controller 110 constantly manages the state of an operation circuit as described above. When there is an operation circuit which is in the secret operation state S1 among the operation circuits (the elliptic operation circuit 101, the RSA operation circuits 102 and 103, and the integer operation circuit 104), the whole operation controller 110 controls other operation circuits to enter the operation state in which the power waveforms become random (the random number operation state S3 or the forced random number operation state S4). In summary, the whole operation controller 110 controls the state of each operation circuit so that the secret operation and the random number operation are concurrently executed.

In this way, by concurrently executing the random number operation while the secret operation is executed, the power consumption waveforms can be disturbed, whereby the signature generation apparatus 100 is able to have a tolerance for side-channel attacks.

The whole operation controller 110 includes an operation controller 111 and a power waveform disturbance controller 112. The configuration of the whole operation controller 110 is not limited to this. The whole operation controller 110 may be formed using independent circuits having the respective two functions, or may be formed to perform two parallel processing corresponding to them.

The operation controller 111 performs data transfer between circuits and transmission of the instruction to each operation circuit to start the operation via the local bus for data transfer 130, to perform control to obtain correct operation results as a result of operations executed according to the group signature generation algorithm described above.

When the operation controller 111 instructs each operation circuit to start the operation, the operation controller 111 further instructs which state of three states (the secret operation state S1, the normal operation state S2, and the random number operation state S3) each operation circuit should be entered. Note that each of the operation circuits makes a transition to the stopped state S0 upon completion of the operation. Further, as will be described later, the power waveform disturbance controller 112 of the whole operation controller 110 instructs the operation circuit to make a transition between the stopped state S0 and the forced random number operation state S4.

Further, when instructing the operation circuit to start the operation for the normal operation state S2, the operation controller 111 checks whether there are another operation circuit that is in the secret operation state S1. When there is an operation circuit which is in the secret operation state S1, the operation controller 111 holds the instruction to start the operation of the normal operation state S2 to determine whether there is a random number operation that can be started until when the secret operation in the operation circuit is ended. When there is a random number operation that can be started, the operation controller 111 instructs the start of the random number operation to disturb the power consumption waveforms.

When there are a plurality of operation circuits that are in the secret operation state S1, the operation controller 111 controls the operation circuits so that equal or larger number of operation circuits than the number of operation circuits that are in the secret operation state S1 enter the random number operation state S3. When the number of operation circuits that are in the random number operation state S3 is smaller than the number of operation circuits that are in the secret operation state S1, as will be described later, the power waveform disturbance controller 112 of the whole operation controller 110 supplies the random number data to the operation circuit which is in the stopped state S0 to forcibly execute the random number operation.

The power waveform disturbance controller 112 constantly monitors the operation state of each of the operation circuits via the signal line 120, and transmits, to each operation circuit, the random number operation instruction signal to forcibly start the random number operation, and the random number data which serves as an argument of the random number operation.

When there is an operation circuit which is in the secret operation state S1, the power waveform disturbance controller 112 promptly issues an instruction to start execution of the forced random number operation to a free operation circuit (operation circuit which is in the stopped state S0). In this specification, "promptly" or "at high speed" means time sufficiently earlier than the time at which data to be concealed is leaked when the operation circuit is in the secret operation state S1, e.g., within a few clocks to several tens of clocks.

When there is an operation circuit which is in the secret operation state S1, the power waveform disturbance controller 112 changes the state of the operation circuit which is in the stopped state S0 to the forced random number operation state S3 so that the total number of the operation circuits that are in the random number operation state S3 or the forced random number operation state S4 becomes equal to or larger than the number of operation circuits that are in the secret operation state S1. In short, when the number of operation circuits that are in the random number operation state S3 is insufficient compared to the number of operation circuits that are in the secret operation state S1, the power waveform disturbance controller 112 instructs the operation circuit which is in the stopped state S0 to start the forced random number operation.

Upon receiving the random number operation instruction signal from the power waveform disturbance controller 112, the operation circuit promptly executes the forced random number operation (scalar multiplication on the elliptic curve, modular exponentiation, modular multiplication, and integer multiplication) that uses the random number data that is supplied as an argument. In this operation, the state of the operation circuit is in the forced random number state S4.

The time during which the operation circuit is in the secret operation state S1 depends on the key or the random value, and thus cannot be predicted in advance. Therefore, the power waveform disturbance controller 112 dynamically determines whether it is possible to continue the forced random number operation and whether there is an operation circuit that is able to start the forced random number operation while constantly monitoring the operation state of each operation circuit. When there is no more operation circuit which is in the secret operation state S1 or the execution of the random number operation is possible using another operation circuit, the power waveform disturbance controller 112 promptly stops the forced random number operation that has been executed.

As described above with reference to FIG. 4, in the group signature generation, the elliptic curve operation and the RSA operation, and the integer operation are not executed at the same time because of characteristics of the operations. Thus, there is always an operation circuit which is in the stopped state S0, and the operation circuit which is in the stopped state S0 may be used for the forced random number operation.

The power waveform disturbance controller 112 may include a linear feedback shift register (LFSR). The power waveform disturbance controller 112 is able to generate the random number data supplied to the operation circuit when the forced random number operation is executed using the linear feedback shift register. By generating a pseudo-random number using the linear feedback shift register and transmitting the pseudo-random number that is generated as an argument of the operation, it is possible to generate the random number in shorter time compared to a case in which the random number is generated using the random number generation circuit 105 for encryption.

When the forced random number operation is executed using the operation circuit which is in the stopped state S0, it is required to promptly put the random number data. The use of the random number generation system which is typically used for the cryptographic processing requires time to generate random numbers. Thus, it may be possible that the power consumption waveforms are not disturbed for long periods of time. It is therefore preferable to use the linear feedback shift register to generate the pseudo-random numbers. While an M-sequence is not preferable as a random number for the cryptographic processing, it is sufficient to disturb power consumption. With the use of the linear feedback shift register, it may be generated by one clock.

Further, the linear feedback register and the random number generation circuit 105 may be connected via the local bus for data transfer 130, and the initial value may be promptly set in the linear feedback shift register using a random number seed stored in the random number seed holding non-volatile memory 108 in advance just after the power supply is turned on. Accordingly, the initial value for random number generation is updated every time the power supply is turned on, whereby it is possible to prevent the same pseudo-random number from being generated.

Further, the value stored in the random number seed holding non-volatile memory 108 may be directly used as the initial value of the linear feedback shift register. More preferably, the value generated using the random number generation circuit 105 for cryptographic processing is used as the initial value of the linear feedback shift register from the viewpoint of predictability.

When the pseudo-random number is used in place of the true random number or the physical random number, if no measures are taken in generation of the pseudo-random number, the same random number sequence is generated every time the power supply is turned on, which generates reproducibility in the power consumption waveforms. It is therefore preferable to store the initial value (initial seed) of the linear feedback shift register and the pseudo-random number generation system in the random number seed holding non-volatile memory 108 in advance, to change (increment) the value so that different random number sequences are generated every time the power supply is turned on. Accordingly, it is possible to prevent the power consumption waveforms from being reproduced even when the pseudo-random number is employed. In particular, from the viewpoint of unpredictability, it is preferable to use the value generated by the pseudo-random number generation system as the initial value of the linear feedback shift register instead of directly using the value stored in the random number seed holding non-volatile memory 108.

Figure 6:
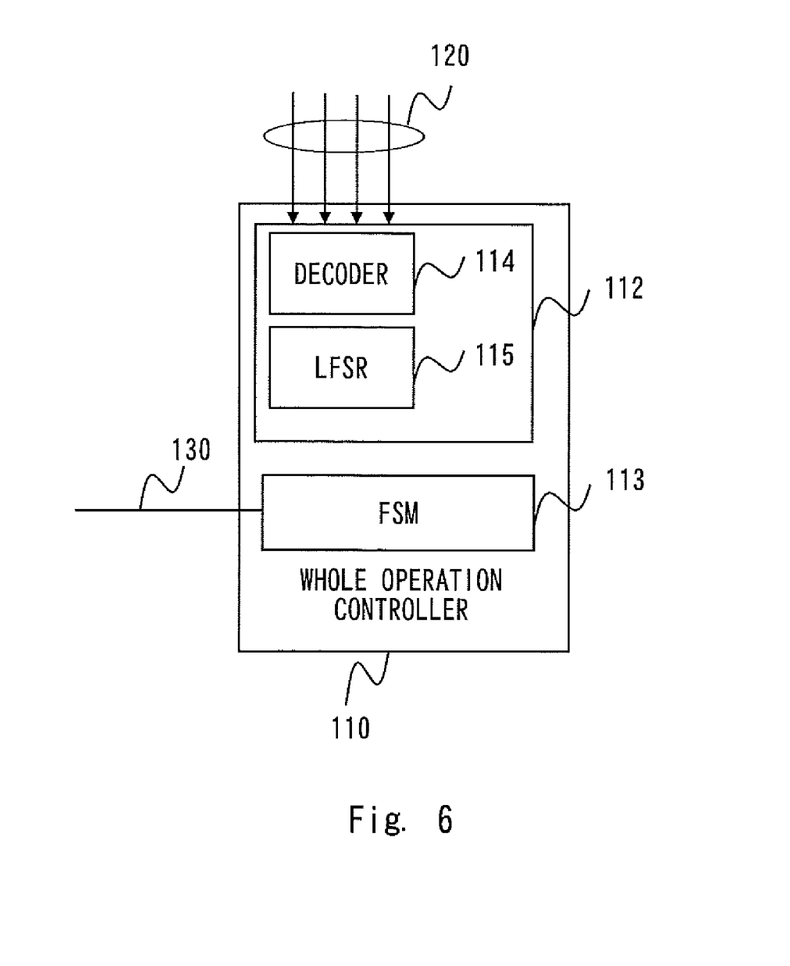
FIG. 6 is a detailed configuration diagram of a whole operation controller according to the first exemplary embodiment.

FIG. 6 is a detailed diagram of an internal configuration of the whole operation controller according to this exemplary embodiment.

As shown in FIG. 6, the whole operation controller 110 includes a finite state machine (FSM) 113, a decoder 114, and an LFSR 115. The finite state machine 113 achieves control executed by the operation controller 111. The decoder 114 operates as an arbiter that interrupts the operation state transmission signal from each operation circuit and instructs execution of the forced random number operation. The LFSR 115 generates random number data when the forced random number operation is executed.

Figure 7:
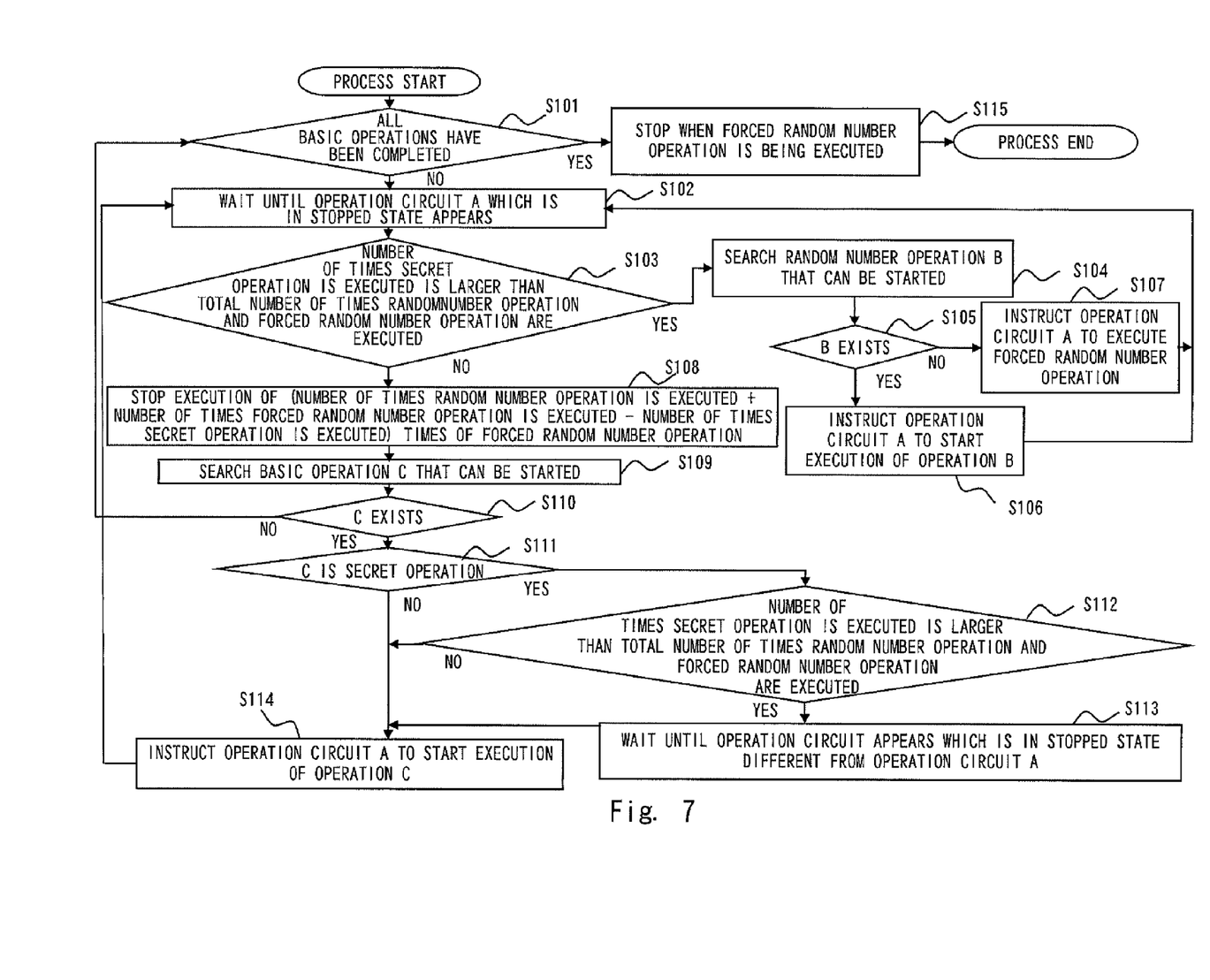
FIG. 7 is an operation control flow diagram of the signature generation apparatus according to the first exemplary embodiment.

Next, with reference to FIG. 7, an operation example of the whole operation controller according to the first exemplary embodiment will be described. FIG. 7 is a flow chart showing an operation example of the whole operation controller. In FIG. 7, an example including the case of executing the forced random number operation is described. However, when the number of times of execution of the random number operation equal to or larger than the number of times of execution of the secret operation can be secured, the forced random number operation may not be executed in addition to the random number operation.

The whole operation controller 110 determines whether execution of all the basic operations (the RSA operation, the elliptic curve operation, the hash operation, and the integer operation) using the operation circuits have been ended (S101). When execution of all the basic operations is ended ("Yes" in S101), if there is an operation circuit that is executing the forced random number operation, the whole operation controller 110 stops the operation in the operation circuit (S115), to end the processing.

When execution of all the basic operations is not ended ("No" in S101), the whole operation controller 110 waits until when the operation circuit A which is in the stopped state S0 appears (S102).

The whole operation controller 110 determines whether the number α of operation circuits that are in the secret operation state S1 is larger than the total number β of operation circuits that are in the random number operation state S3 or the forced random number operation state S4 (S103).

When α is larger than β ("Yes" in S103), the whole operation controller 110 searches the random number operation B that can be started included in the basic operation (S104), to determine the presence or absence of the corresponding random number operation B (S105). When there are a plurality of random number operations B that can be started, any one random number operation may be randomly selected.

When there is a random number operation B ("Yes" in S105), the whole operation controller 110 instructs the operation circuit A to start execution of the random number operation B (S106). When there is no random number operation B ("No" in S105), the whole operation controller 110 instructs the operation circuit A to execute the forced random number operation (S107).

The whole operation controller 110 executes processing in S102-S107, thereby being able to set the total number β of operation circuits that are in the random number operation state S3 or the forced random number operation state S4 to be equal to or larger than the number α of operation circuits that are in the secret operation state S1, which makes it possible to completely disturb power waveforms.

When α is not larger than β ("No" in S103), the whole operation controller 110 stops the forced random number operation which is being executed in the (β-α) pieces of operation circuits among the operation circuits that are executing the forced random number operation (S108). Accordingly, the execution of the forced random number operation is stopped so that α becomes equal to β.

The whole operation controller 110 searches the basic operation C that can be started (S109), to determine the presence or absence of the corresponding basic operation C (S110). When there is no basic operation C ("No" in S110), the whole operation controller 110 goes back to S101 and continues the processing.

When there is a basic operation C ("Yes" in S110), the whole operation controller 110 determines whether the basic operation C is a secret operation (S111). When the basic operation C is not a secret operation ("No" in S111), the whole operation controller 110 instructs the operation circuit A to start the execution of the operation C (S114).

When the basic operation C is a secret operation ("Yes" in S111), the whole operation controller 110 determines whether α+1 is larger than β (S112). When α+1 is larger than β ("Yes" in S112), the whole operation controller 110 waits until the operation circuit appears which is in the stopped state s0 and is different from the operation circuit A that executes the secret operation C (S113). When α+1 is not larger than β ("No" in S112), the whole operation controller 110 proceeds to S114, to execute the secret operation C using the operation circuit A.

When the existing measure against side-channel attacks is used without using this exemplary embodiment, the measure is taken uniformly in all the operation circuits (the elliptic operation circuit 101, the RSA operation circuits 102 and 103, and the integer operation circuit 104). As a result, time required to perform the whole processing of the signature generation becomes doubled at worst (1.5 times in average). Further, the power consumption amount increases in the same way. Otherwise, the size of the whole circuit is almost doubled.

Meanwhile, according to this exemplary embodiment, there is no need to take the measure in individual operation circuits. Further, the ratio of the secret operation in the whole signature generation is extremely small. Thus, even when the disturbance control of the power waveforms is executed during the secret operation (forced random number operation), the influence of an increase in power or the delay of the operation time due to disturbance control of the power waveforms is small. Further, even when the configurations of the power waveform disturbance control and the linear feedback register are added, the increase in the circuit size is small. Accordingly, it is possible to provide a tolerance for side-channel attacks while keeping the operation performance that is similar to the case in which no measures are taken against side-channel attacks.

Second Exemplary Embodiment

Next, a second exemplary embodiment of the present invention will be described. The signature generation apparatus 100 shown in FIG. 5 has been described as the configuration of executing the signature generation processing using a dedicated circuit. Meanwhile, a signature generation apparatus according to the second exemplary embodiment of the present invention achieves processing executed by the signature generation apparatus using a plurality of CPUs. Note that, in the following description, the configuration and the processing that are different from those described above in the first exemplary embodiment will be mainly described, and description of the same configuration and the processing will be omitted.

The signature generation apparatus at least includes a plurality of processor cores for executing the elliptic curve operation, a plurality of processor cores for executing the RSA operation, a plurality of processor cores for executing the integer operation, a processor core for executing the random number generation, a processor core for executing the hash operation, a shared memory, and a processor for executing the whole operation control.

The processor core for executing the whole operation control instructs the processor core that executes the basic operation to enter the state S5, to change the state of the processor core to the state used in processing completely different from the signature generation processing. The processor core which has entered the state S5 makes a transition to the state S0 upon completion of the processing. Accordingly, the configurations of the plurality of processor cores used to execute the basic operations are dynamically reconstructed.

When the number of processor cores used to execute the basic operations is increased, it is possible to sufficiently secure the processor cores that are able to execute the forced random number operation compared to the number of processor cores executing the secret operation. Accordingly, it is possible to start execution of the forced random number operation without waiting for the appearance of the processor core which is in the stopped state.

As described above, according to the present invention, by executing the random number operation or the forced random number operation simultaneously with the secret operation, it is possible to hide the data to be concealed which is used as an argument of the secret operation.

Attention is focused on the fact that the operation using the random number is included in the operation of the group signature, and these random number operation and secret operation are executed simultaneously and in parallel. In this case, it is possible to perform hiding without increasing any of power consumption and calculation time.

Further, if the secret operation and the random number operation cannot be executed at the same time, or if the random number operation is ended in shorter time compared to the secret operation, other random number operations included in the group signature operation are executed. Even in this case, power consumption and calculation time do not increase.

Further, when the random number operation included in the group signature operation cannot be executed at the same time, the forced random number operation is executed using the random number data that is newly generated. The operation results of the forced random number operation mean nothing particularly, but the obtained operation results are discarded.

From the viewpoint of suppressing the increase in power consumption, it is preferable to execute the random number operation included in the group signature operation as much as possible when the secret operation is being executed. However, only the forced random number operation may be executed at the same time. In this case, there is no need to perform processing of searching the random number operation that can be started although power consumption increases.

Further, the signature generation processing stated above may be achieved as a signature generation program executed by a computer. When the signature generation apparatus is formed using a plurality of computers (CPUs), the signature generation program causes each computer to execute the random number generation, the RSA operation, the elliptic curve operation, the integer operation, and the hash operation.

Further, when the signature generation apparatus is formed using one computer, the signature generation program causes a computer to execute basic operations including the RSA operation, the elliptic curve operation, and the integer operation in parallel. Then, the signature generation program causes the computer to concurrently execute, in the parallel execution step, the secret operation in which the data to be concealed is used as an argument and the random number operation which uses a random number as an argument. When these processing are executed using one CPU, they are executed as parallel processing such as multi-threading or multi-processing instead of sequential computation.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

As described above, according to the exemplary embodiments, it is possible to provide a signature generation apparatus, a signature generation method, and a signature generation program suitable for achieving signature generation at high speed and with low power while maintaining a tolerance for side-channel attacks without causing a decrease in signature generation speed, an increase in power consumption, and an increase in circuit size.

While the present invention has been described with reference to the exemplary embodiments, the present invention is not limited to the description above. Various changes that can be understood by a person skilled in the art may be made to the configuration and the detail of the present invention.

This application claims the benefit of priority, and incorporates herein by reference in its entirety, the following Japanese Patent Application No. 2010-122780 filed on May 28, 2010.

INDUSTRIAL APPLICABILITY

The present invention is applicable to various security techniques such as encryption.

REFERENCE SIGNS LIST

1 SIGNATURE GENERATION APPARATUS
2, 3, 4, 5, 6 BASIC OPERATION EXECUTION UNIT
7 WHOLE OPERATION CONTROLLER
11 SIGNATURE GENERATION APPARATUS
12, 13, 14, 15, 16 BASIC OPERATION EXECUTION UNIT
17 WHOLE OPERATION CONTROLLER
18 COMMUNICATION PATH
19 DATA TRANSFER PATH
21 ELLIPTIC CURVE OPERATION
22 RSA OPERATION
23 HASH OPERATION
24 INTEGER OPERATION
100 SIGNATURE GENERATION APPARATUS
101 ELLIPTIC OPERATION CIRCUIT
102, 103 RSA OPERATION CIRCUIT
104 INTEGER OPERATION CIRCUIT
105 RANDOM NUMBER GENERATION CIRCUIT
106 HASH OPERATION CIRCUIT
107 SHARED MEMORY
108 RANDOM NUMBER SEED HOLDING NON-VOLATILE MEMORY
110 WHOLE OPERATION CONTROLLER
111 OPERATION CONTROLLER
112 POWER WAVEFORM DISTURBANCE CONTROLLER
113 FSM
114 DECODER
115 LFSR
120 SIGNAL LINE
130 LOCAL BUS FOR DATA TRANSFER

What is claimed is:

1. A signature generation apparatus comprising:
a plurality of basic operation execution units each executing a basic operation included in a signature generation procedure; and
a whole operation controller connected to the plurality of basic operation execution units to control operations in the basic operation execution units and monitor operation states of the basic operation execution units,
wherein when there is a basic operation execution unit among the plurality of basic operation execution units which is executing a secret operation which uses data to be concealed as an argument, the whole operation controller causes basic operation execution units other than the basic operation execution unit to simultaneously execute a random number operation which uses a random number originally used for signature generation as an argument.

2. The signature generation apparatus according to claim 1, wherein
the signature generation apparatus receives a message and key information including a private key, and executes a complex operation using a plurality of random numbers that are generated, to generate a signature for the message,
the data to be concealed is data including the private key, and a first random number used to mask the private key among the plurality of random numbers, and
when there is a basic operation execution unit among the plurality of basic operation execution units which is executing the secret operation which uses the data to be concealed as an argument, the whole operation controller causes basic operation execution units other than the basic operation execution unit to simultaneously execute a random number operation which uses a second random number different from the first random number as an argument among the plurality of random numbers, or the whole operation controller newly generates a third random number that is different from the plurality of random numbers to simultaneously execute a random number operation which uses the third random number as an argument.

3. The signature generation apparatus according to claim 2, wherein when there is a basic operation execution unit among the plurality of basic operation execution units which is executing the secret operation which uses the data to be concealed as an argument, the whole operation controller determines whether basic operation execution units other than the basic operation execution unit are able to start the random number operation which uses the second random number as an argument, causes the basic operation execution units other than the basic execution unit to simultaneously execute the random number operation which uses the second random number as an argument when it is determined that the random number operation can be started, and causes the basic operation execution units other than the basic operation execution unit to simultaneously execute the random number operation which uses the third random number as an argument when it is determined that the random number operation cannot be started.

4. The signature generation apparatus according to claim 1, wherein when there are a plurality of basic operation execution units that are executing the secret operation among the plurality of basic operation execution units, the whole operation controller performs control so that the number of basic operation execution units that simultaneously operate the random number operation is equal to or larger than the number of basic operation execution units that are executing the secret operation.

5. The signature generation apparatus according to claim 1, further comprising a local bus for data transfer for connecting the plurality of basic operation execution units and the whole operation controller, wherein
the signature generation procedure comprises an RSA operation, an elliptic curve operation, an integer operation, and a hash operation, and
the plurality of basic operation execution units comprises:
a plurality of RSA operation circuits each executing the RSA operation;

a plurality of elliptic operation circuits each executing the elliptic curve operation;

a plurality of integer operation circuits each executing the integer operation; and a hash operation circuit for executing the hash operation.

6. The signature generation apparatus according to claim 5, further comprising a plurality of signal lines connecting the plurality of respective basic operation execution units and the whole operation controller, wherein the whole operation controller comprises:

an operation controller for controlling an operation in each of the operation circuits forming the plurality of basic operation execution units; and a power waveform disturbance controller for monitoring an operation state of each of the operation circuits from an operation state transmission signal transmitted through the plurality of signal lines, and transmitting to each of the operation circuits a random number operation instruction signal to forcibly start the random number operation and random number data which is an argument of the random number operation.

7. The signature generation apparatus according to claim 6, wherein the power waveform disturbance controller further comprises a linear feedback register for generating the random number data.

8. The signature generation apparatus according to claim 5, further comprising a random number generation circuit for generating a random number.

9. The signature generation apparatus according to claim 8, further comprising a random number seed holding non-volatile memory in which a random number seed used for an initial value of random number generation processing is stored in advance.

10. The signature generation apparatus according to claim 1, further comprising a local bus for data transfer for connecting the plurality of basic operation execution units and the whole operation controller, wherein the plurality of basic operation execution units are formed using a plurality of processor cores each executing any of the operations included in the basic operation, and the whole operation controller dynamically reconstructs a configuration of the plurality of processor cores used to execute the basic operation.

11. The signature generation apparatus according to claim 1, wherein the signature generation procedure is a procedure for generating a group signature.

12. A signature generation method, wherein a signature generation apparatus executes basic operations included in a signature generation procedure in parallel, and when a secret operation which uses data to be concealed as an argument is executed while the basic operations are executed in parallel, the signature generation apparatus simultaneously executes a random number operation which uses a random number originally used for signature generation as an argument.

13. A non-transitory computer readable medium storing a signature generation program for causing a computer to execute the following processing of:

executing basic operations included in a signature generation procedure in parallel; and simultaneously executing a random number operation which uses a random number originally used for signature generation as an argument while executing a secret operation which uses data to be concealed as an argument in the processing of executing the basic operations in parallel.

* * * * *